United States Patent
Pell et al.

(10) Patent No.: US 10,489,238 B2
(45) Date of Patent: Nov. 26, 2019

(54) ANALYZING SCREENSHOTS TO DETECT APPLICATION ISSUES

(71) Applicant: Facebook, Inc., Menlo Park, CA (US)

(72) Inventors: Oliver Pell, London (GB); Davide Guerri, London (GB)

(73) Assignee: Facebook, Inc., Menlo Park, CA (US)

( * ) Notice: Subject to any disclaimer, the term of this patent is extended or adjusted under 35 U.S.C. 154(b) by 122 days.

(21) Appl. No.: 15/796,796

(22) Filed: Oct. 28, 2017

(65) Prior Publication Data
US 2019/0129823 A1    May 2, 2019

(51) Int. Cl.
*G06F 11/07* (2006.01)

(52) U.S. Cl.
CPC ........ *G06F 11/0793* (2013.01); *G06F 11/079* (2013.01)

(58) Field of Classification Search
CPC . G06F 11/079; G06F 11/0793; G06F 11/1476
USPC .......................................................... 714/26
See application file for complete search history.

(56) References Cited

U.S. PATENT DOCUMENTS

| | | | |
|---|---|---|---|
| 7,406,653 B2* | 7/2008 | Ide | G06F 16/35 714/799 |
| 8,713,378 B2* | 4/2014 | Eck | G06F 9/45545 714/10 |
| 10,019,716 B1* | 7/2018 | Ainslie | G06Q 30/016 |
| 2016/0277863 A1* | 9/2016 | Cahill | H04R 3/005 |
| 2017/0243228 A1* | 8/2017 | Wang | G06K 9/00449 |
| 2018/0262525 A1* | 9/2018 | Yan | G06N 20/00 |

* cited by examiner

*Primary Examiner* — Joseph R Kudirka
(74) *Attorney, Agent, or Firm* — Fenwick & West LLP

(57) ABSTRACT

A client management server manages client devices deployed throughout an enterprise facility that may be used for various applications such as wayfinders and internal and external meeting room computers. The client management receives screenshots from the client devices and applies a classifier to classify an operating state of each device as corresponding to a normal operating state or an error state. If the operating state is classified as corresponding to the error state, a remedial action is triggered. The classifier may be a machine trained model that is trained using supervised or unsupervised learning, including by simulating errors on the clients.

20 Claims, 5 Drawing Sheets

ANALYZING SCREENSHOTS TO DETECT APPLICATION ISSUES

BACKGROUND

This disclosure relates generally to detecting application issues by analyzing screenshots.

As computer devices become less expensive, enterprises are deploying increased numbers of devices throughout enterprise facilities. For example, enterprises may use electronic displays in place of physical signage, and may provide various portal devices at locations throughout the facilities to enable individuals to access information or perform other tasks. As the number of devices on the enterprise network increases, it becomes increasingly costly to ensure that all devices are functioning properly. While hardware issues can often be detected using various sensors or testing tools, application malfunctions are difficult to remotely detect in an automated way using conventional techniques.

SUMMARY

A method, non-transitory computer-readable storage medium, and computing device detects application errors on client devices based on screenshots. A client management server receives from a client device, a first screenshot representing first content displayed on the client device. The client management server applies a classifier based on a classification model to classify an operating state of the client based on the first screenshot as corresponding to a normal operating state or an error state. Responsive to the classifier classifying the operating state as corresponding to the error state, the client management client causes the client device to perform a remedial action (e.g., a restart).

In an embodiment, the client management server may receive a second screenshot representing second content displayed on the client device following the remedial action. The client management server applies the classifier to classify the operating state of the client based on the second screenshot. Responsive to the classifier classifying the second screenshot as corresponding to the error state, the client management server sets an escalation flag associated with the client device. If after setting the escalation flag, the client management server receives an indication that client device is actually working properly, the client management server resets the escalation flag, adds the second screenshot to a training set of screenshots indicative of the normal operating state, and re-trains the classification model based on the training set.

In an embodiment, the client management server may furthermore identify a configuration of the client device at a time corresponding to capturing the first screenshot, and select the classification model from a predefined set of classification models each corresponding to a different possible configuration.

In an embodiment, applying the classifier comprises deriving a set of visual features from the first screenshot to generate a client feature vector and performing a feature vector comparison of the client feature vector with a plurality of reference feature vectors. The plurality of reference feature vectors may be derived from a plurality of reference screenshots captured during the normal operating state. A classification score is then generated based on a similarity between the client feature vector and the plurality of reference feature vectors. A threshold comparison of the classification score is performed with a predefined threshold value, and the operating state is classified based on the threshold comparison.

In an alternative embodiment, a first feature vector comparison of the client feature vector is performed with a first plurality of reference feature vectors and a second feature vector comparison of the client vector is performed with a second plurality of reference feature vectors. Here, the first plurality of reference feature vectors are derived from a first plurality of reference screenshots captured during the normal operating state and the second plurality of reference feature vectors are derived from a second plurality of reference screenshots captured during the error state. The client management server generates a first classification score based on a similarity between the client feature vector and the first plurality of reference feature vectors and a second classification score based on a similarity between the client feature vector and the second plurality of reference feature vectors. The first screenshot is then classified based on the first classification score and the second classification score.

In an embodiment, prior to performing the second feature vector comparison, errors may be simulated on a plurality of training client devices by causing the plurality of training devices to operate in the error state. The second plurality of reference screenshots are then received from the training client devices, and the second plurality of reference feature vectors are derived from the second plurality of reference screenshots.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A client management server manages client devices deployed throughout an enterprise facility that may be used for various applications such as wayfinders and internal and external meeting room computers. The client management receives screenshots from the client devices and applies a classifier to classify an operating state of each device as corresponding to a normal operating state or an error state. If the operating state is classified as corresponding to the error state, a remedial action is triggered. The classifier may be a machine trained model that is trained using supervised or unsupervised learning, including by simulating errors on the clients.

System Architecture

Figure 1:
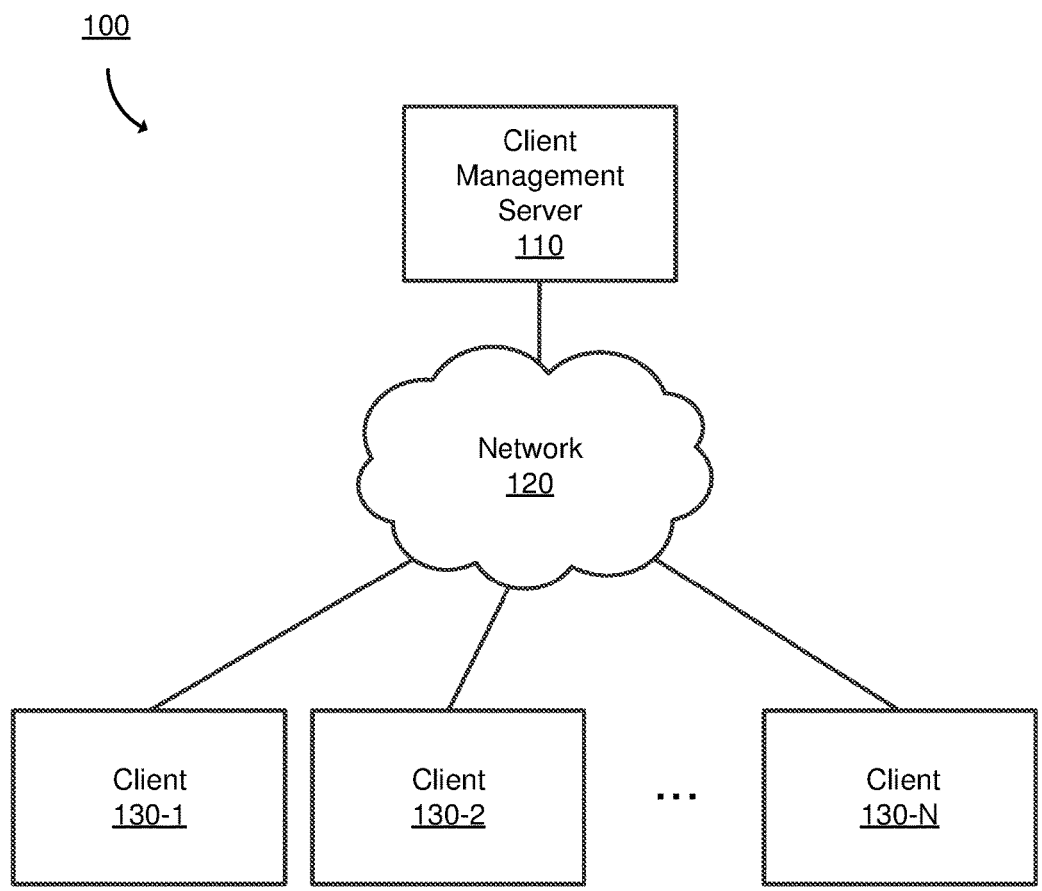
FIG. 1 is a block diagram illustrating an example embodiment of a computing environment.

FIG. 1 is a block diagram of an enterprise computing environment 100. The enterprise computing environment 100 comprises a client management server 110, a network 120, and a plurality of clients 130-1, 130-2, . . . , 130-N (collectively referred to herein as clients 130). In alternative configurations, different and/or additional components may be included in the enterprise computing environment 100.

The clients 130 are network-enabled computing devices capable of communicating data over the network 120, receiving user input, and outputting information to users. In one embodiment, the clients 130 may comprise specialized computing devices having limited functionality. For example, the client 130 may be configured to execute a simple operating system and a relatively lightweight client application. The clients 130 may have hardware sufficient to execute the client application without necessarily including more complex general purpose hardware. Thus, the clients 130 may be constructed at relatively low cost and complexity compared to a general purpose computing device since they are customized to perform a limited number of specialized functions.

In other embodiments, the clients 130 may comprise conventional general purpose computer devices. In these embodiments, the clients 130 may comprise hardware and software associated with general computing devices. Here, the client 130 may execute an operating system that enables to execute a wide range of client applications for performing various functions described herein. For example, a client 130 may comprises a laptop computer, tablet, smartphone, or smartwatch.

Clients 130 may be deployed throughout an enterprise facility and configured to serve different roles within the enterprise. Here, each role corresponds to a particular configuration of the client 130 that may control how the client 130 operates and may dictate the functions or set of functions performed by the client 130. For example, a client 130 provisioned for use as a wayfinder may be mounted on walls throughout an enterprise and may display an interactive map to help direct viewers to a desired location within the enterprise. Other clients 130 may be configured as in-room management devices that may be deployed on a wall or on a table within a conference room. These in-room management devices may enable functions such as conference calling, controlling audio/video devices within the conference room, providing a directory of individuals associated with the enterprise, maintaining a schedule associated with the conference room, or other room management functions. Other clients may be configured as outside-room management devices that may be deployed on a wall immediately outside a conference room. These outside-room management device may be configured to provide functions such as displaying identifying information associated with the conference room, displaying a schedule associated with use of the conference room, or enabling individuals outside of the conference room to send a notification to an in-room management device inside the room. Yet other clients 130 may be deployed as sign-in kiosks to enable visitors to a facility to register with the enterprise. Other clients 130 may be configured to perform different functions. An example embodiment of a client 130 is described in further detail below with respect to FIG. 2.

The network 120 facilitates communications between the clients 130, the client management server 110, and any other devices on the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable encryption technique.

Example Client

Figure 2:
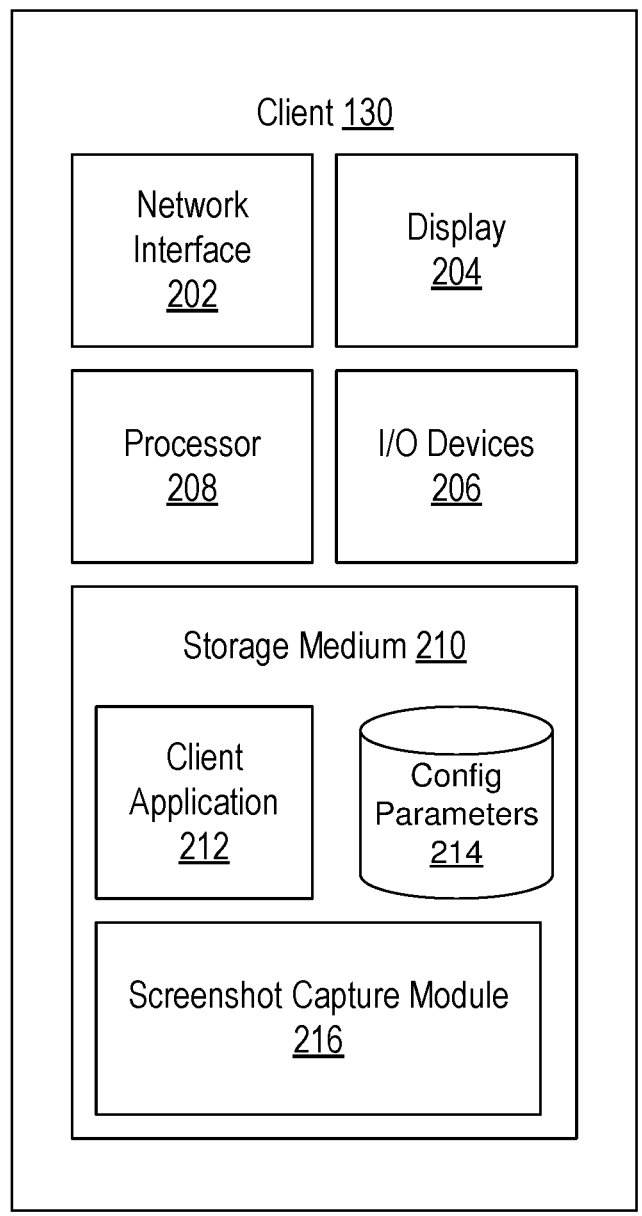
FIG. 2 is a block diagram illustrating an example embodiment of a client device.

FIG. 2 is a block diagram of an embodiment of a client 130. The client 130 includes a network interface 202, a display 204, input/output (I/O) devices 206, a processor 208, and a storage medium 210. The storage medium 210 stores a client application 212 and configuration parameters 214. In other embodiments, the client 130 may include additional, fewer, or different components.

The network interface 202 comprises hardware, firmware, and/or software to facilitate communication with the network 120. The network interface 202 may utilize any conventional wired or wireless communication protocols or a custom communication protocol.

The display 204 comprises a screen for displaying visual information such as images, video, or text. The display 204 may comprise, for example, a liquid crystal display (LCD), light-emitting diode (LED) display, an organic light-emitting diode (OLED) display, or other display screen. The display 204 may optionally including integrated touch sensing technology.

The I/O devices 206 include hardware, firmware, and/or associated software to enable users to provide inputs to the client 130 and to enable the client 130 to provide various outputs. For example, the I/O devices 206 may include input devices such as a touch sensor or touch panel, a keyboard or keypad, a mouse, a joystick, a gesture recognition system, a microphone, a voice recognition system, physical buttons, dials, or switches, or other input devices. Furthermore, the I/O devices 206 may include integrated output devices as a speaker, a haptic feedback device, or other output device. The I/O devices 206 may also include communication ports to enable the client 130 to control external devices such as external displays, speakers, or communication devices.

The client application 212 comprises instructions stored to the storage medium 210 (e.g., a non-transitory computer-readable storage medium) that when executed by the processor 208, carry out functions attributed to the client 130 described herein. The specific functionality of the client application 212 may depend on the configuration parameters 214. For example, as described above, a client 130 may be configured to operate as a wayfinder, in-room client management device, outside-room client management device, kiosk, or other device. In each of these configurations, the client application 212 may provide functions to enable the client 130 to operate in its configured role.

The client application 212 may include a graphical user interface that displays information on the display 204 and may enable individuals to access various features of the client application. For example, the user interface may present various controls and menus and may present various information on the display 204. In an embodiment, because the client 130 is generally configured to perform a limited number of functions, the user interface of the client application 212 may be limited to a relatively small number of different possible user interface states controlling the general layout and features of the user interface (but not necessarily the specific data displayed). Thus, during proper operation of the client application 212, the possible features of the user interface being displayed may be reasonably limited and predictable.

The client application 212, or its underlying operating system, may include built-in error routines that cause error messages to appear in the user interface in response to an error occurring. In other cases, an explicit error message may not be generated when an error occurs, but the error may cause the user interface state to fail to update in an expected manner. Such application errors may occur, for example, due to failures of the network 120, due to code bugs introduced in a software update, due to memory on the client 130 or the client management server 110 becoming corrupted, due to malware being introduced on the client 130, due to hardware failures, or due to other unexpected occurrences.

The screenshot capture module 216 captures a screenshot comprising a digital image representing visual information being displayed on the display 204 of the client 130 at the time of capture. The screenshot capture module 216 may be configured to periodically capture screenshots at predefined intervals, in response to a request from the client management server 110, or in response to some other detectable event (e.g., a restart). The screenshot capture module 216 may send the captured screenshots to the client management server 110 (via the network interface 202). In an embodiment, instead of capturing individual images, the screenshot capture module 216 may capture screenshots comprising a sequence of images at fixed time intervals so as to represent a video representing visual information being displayed on the display over a given time period.

Client Management Server

Figure 3:
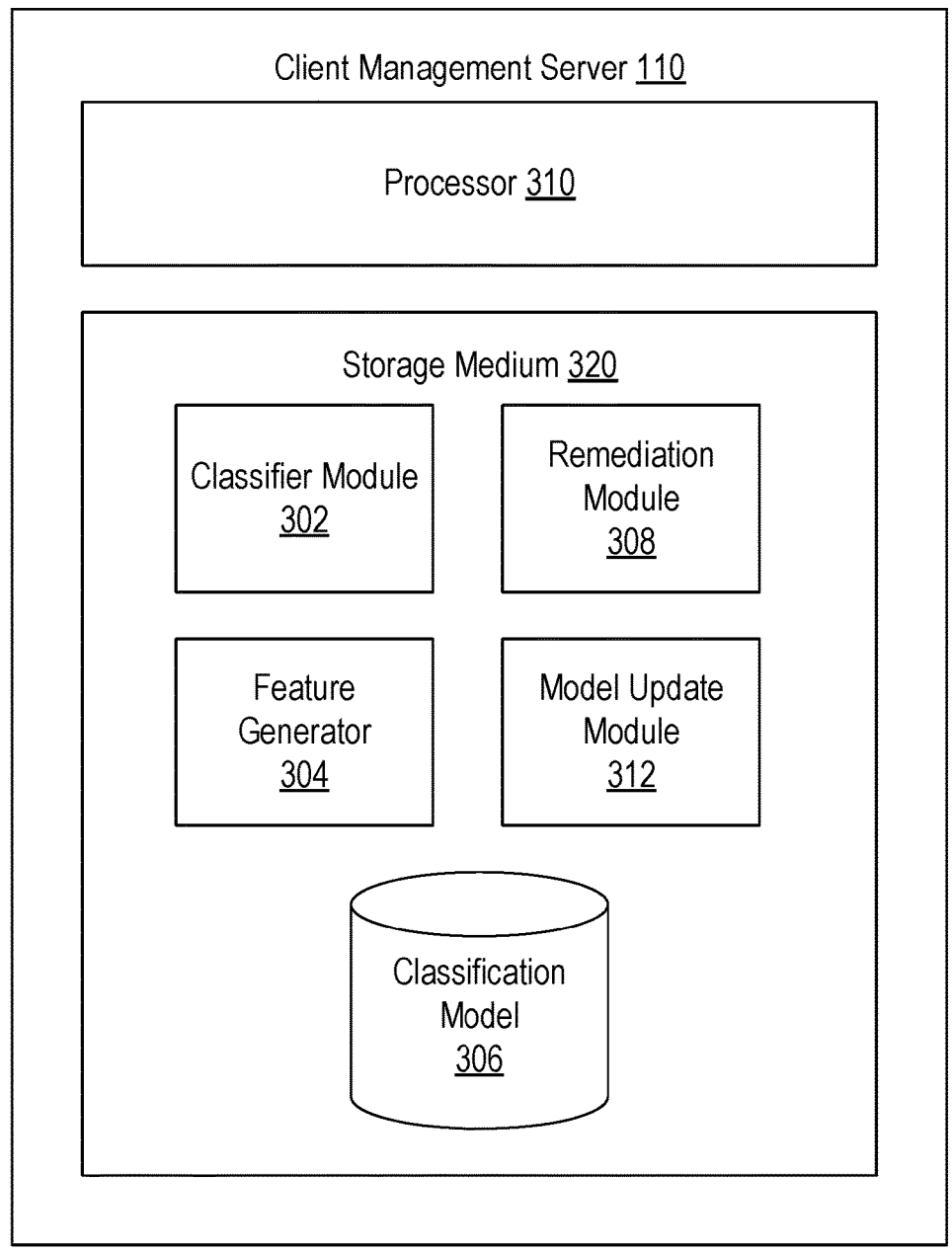
FIG. 3 is a block diagram illustrating an example embodiment of a client management server.

FIG. 3 illustrates an example embodiment of a client management server 110. The client management server 110 comprises a processor 310 and a storage medium 320 (e.g., a non-transitory computer-readable storage medium). The storage medium 320 stores various modules comprising instructions that when executed by the processor 310 causes the processor 310 to perform functions associated with the client management server 110 described herein. In an embodiment, the storage medium 320 stores a classifier module 302, a feature generator 304, a remediation module 308, a model updater 312, and a classification model 306. In alternative embodiments, the client management server 110 may include additional, fewer, or different modules or the functionality associated with each module may be distributed differently.

The classifier module 302 receives a screenshot (comprising a single image or an image sequence) from a client 130 and applies a classification algorithm based on parameters stored in the classification model 306 to classify an operating state of the client 130. For example, the classifier module 302 may classify the operating state of the client 130 based on the screenshot as either corresponding to a normal operating state (e.g., no application error is detected) or an error state (a possible application error is detected).

In one embodiment, the classifier module 302 generates a classification score based on the screenshot indicating a likelihood that the screenshot was captured during a normal operating state. The classifier module 302 then compares the classification score to a threshold and classifies the operating state of the client 130 as corresponding to the normal operating state if the classification score is above the threshold, and otherwise classifies the operating state as corresponding to the error state.

In an embodiment, the classification score may be determined based on a detected similarity between the screenshot and a set of reference screenshots representing normal operating states of the client 130. For example, in one embodiment, the feature generator 304 extracts image features from the screenshot such as, for example, edges, color histograms, or other visual descriptors and generates a feature vector representing the features. The classifier module 302 then compares the feature vector for the received screenshot against a plurality of reference feature vectors for the reference screenshots and determines the classification score based on distances between the feature vector for the received screenshot and the reference feature vectors for the reference screenshots.

In another embodiment, the classifier module 302 may compare the client feature vector to a first set of reference feature vectors corresponding to a first class of reference screenshots (e.g., corresponding to the normal operating state) and to a second set of reference features vectors corresponding to a second class of reference screenshots (e.g., corresponding to the error state). The classifier module 302 may then generate a first classification score representing distances to the first set of reference feature vectors and a second classification score representing distances to the second set of reference feature vectors. The classifier module 302 may then classify the operating state based on the first and second classification scores. For example, the classifier module 302 classifies the screenshot as belonging to the first class (corresponding to the normal operating state) if the first classification score indicates a better match than the second classification score, and the classifier module 302 classifies the operating state as belonging to the second class (corresponding to the error state) if the second classification score indicates a better match than the first classification score.

The classification model 306 stores learned parameters applied by the classifier module 302 when generating a classification score. The learned parameters may control, for example, weights applied to the different features in a function or algorithm that generates the classification score from the feature vectors. In an embodiment, the classification model 306 may be learned by training the model using screenshots known to correspond to a normal operating state of a client 130. Alternatively, the classification model 306 may be learned by training the model using a first set of training screenshots known to correspond to the normal operating state and a second set of training screenshots known to correspond to an error state.

The remediation module 308 causes a client 130 to take a remedial action in response to the classifier 302 classifying the operating condition of the client 130 as corresponding to the error state. For example, the remediation module 308 may cause the client 130 to restart in response to detecting the error state. Alternatively, the remediation module 308 may cause the client 130 to revert back to a prior stored state before the error state was detected. In other embodiments, the remediation module 308 may cause the client application 212 to be uninstalled and reinstalled on the client 130.

In one embodiment, following the remedial action, the remediation module 308 may cause the client 130 to capture a new screenshot, which may be classified by the classifier 302 to determine if the remedial action resolved the error. If the classifier module 302 still detects the error state, the remediation module 308 may cause an escalation flag associated with the client 130 to be asserted (e.g., in a client database). The escalation flag may alert a service technician to manually check the client 130 to determine if the error condition is present or if the detection is a false positive.

The model update module 312 may update the classification model 306 by re-learning the model parameters based on an updated set of training images. For example, if a false positive is detected, the screenshot that resulted in the false positive may be added to a set of training screenshots and the classification model 306 may be re-trained using the updated training screenshots. Adding the known false positive to the training set reduces the likelihood that the false positive will reoccur for a similar screenshot.

In another embodiment, the model update module 312 simulates error conditions on the client 130 by sending data to the clients 130 known to cause errors. For example, the model update module 312 may send corrupted data or data indicative of a hardware failure that is not actually present. The model update module 312 then causes the clients 130 to capture and send a screenshot. The screenshot may be added to a training data set associated with the error state and the model update module 312 may re-learn the classification model 306 based on the updated training data.

In alternative embodiments, instead of having a single error state, the classifier module 302 may classify the operating state as corresponding to one of any number of different error states. Here, features associated with multiple different reference screenshots sets may be learned as part of the classification model 306, and the classifier module 302 may determine whether the client feature vector derived from a screenshot is most similar to reference feature vectors associated with the normal operating state or any specific error state.

In an embodiment, the classification model 306 may include a plurality of sub-models each associated with a different one of the possible client roles. Here, each sub-model may be based on training images associated only with screenshots from clients 130 operating in that role. When the classifier module 302 receives a screenshot, it first determines what role the client 130 is operating in, and then applies the sub-model associated with that role.

In an embodiment, the classification model 306 may initially be trained in an offline supervised training process in which the classification model 306 is learned from labeled training screenshots that may represent the normal operating state or the error state. The initial classification model 306 may be updated by the model update module 312 based on new screenshots obtained during operation that have been verified as corresponding to either the normal operating state or the error state. In other embodiments, the classification model 306 may be learned in an unsupervised manner. For example, because it may be assumed that the vast majority of clients 130 are operating in a normal operating state, screenshots obtained from a large number of clients 130 over a period of time may be clustered based on similarities between the screenshots. Clusters with large numbers of screenshots may be automatically labeled as corresponding to a normal operating state, while clusters with a small number of screenshots may be deemed outliers and labeled as corresponding to an error state. Once these labels are automatically obtained, the classification model 306 may be learned.

In other embodiments, the classification model 306 may include other information besides screenshots. Here, the classification model 306 may be based on, for example, operating conditions of the clients 130, sensor data from the clients 130 or other information that may be relevant to determining whether the client 130 is operating normally or is in an error state. The classifier 302 may obtain a screenshot together with additional metadata and apply the classification model 306 to determine the operating state based on a combination of data that is not necessarily limited to screenshot features.

Figure 4:
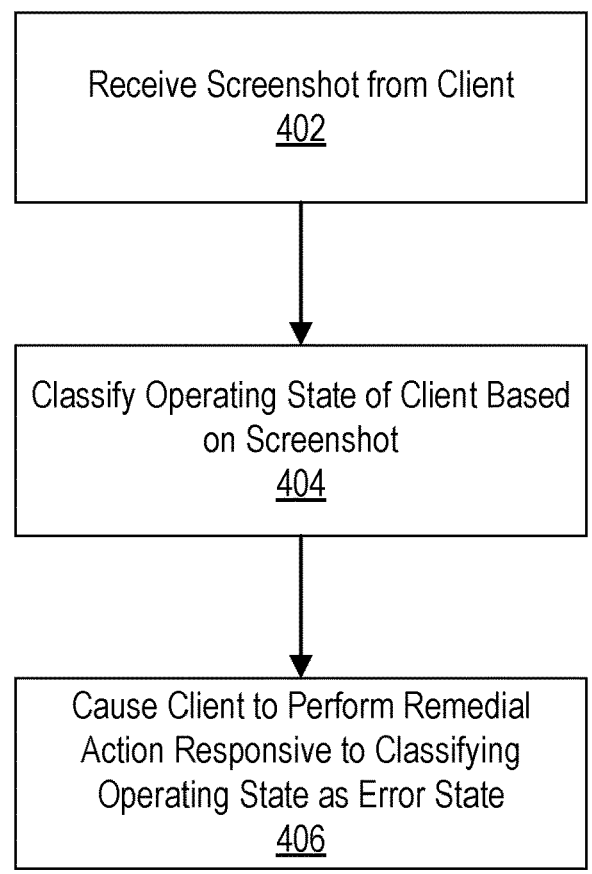
FIG. 4 is a flowchart illustrating an example process for detecting an error state on a client device.

FIG. 4 is a flowchart illustrating an embodiment of a process for managing a client 130. The client management server 110 receives 402 a screenshot from a client representing content displayed on the client 130. The client management server 110 applies 404 a classifier to classify an operating state of the client based on the screenshot as corresponding to either a normal operating state or an error state. Responsive to the classifier classifying the operating state as corresponding to the error state, the client management server 110 causes 406 the client 130 to perform a remedial action. For example, the client management server 110 may cause the client 130 to restart.

In an embodiment, the client management server 130 may receive an updated screenshot from the client 130 following the remedial action. If the client management server 110 classifies the updated screenshot as still corresponding to the error condition, the client management server 110 may raise an escalation flag associated with the client 130 to dispatch a technician to manually check the client 130. If a false positive is detected, the screenshot may be used to re-train the classification model 306.

Figure 5:
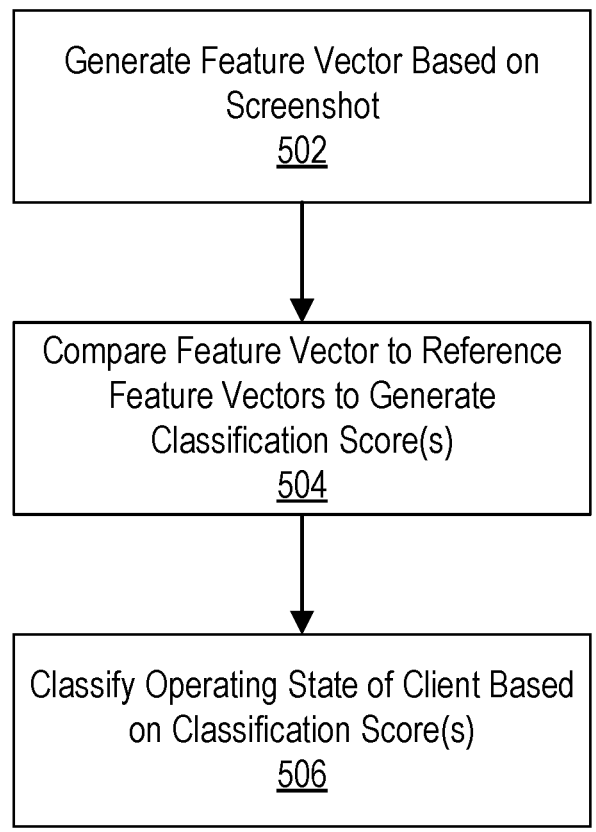
FIG. 5 is a flowchart illustrating an example process for classifying an operating state of a client device based on a screenshot.

FIG. 5 is a flowchart illustrating an embodiment of a process for classifying an operating state of a client 130 based on a screenshot. The client management server 110 generates 502 a client feature vector representing features of the screenshot. In some embodiments, the feature vector may include additional features associated with the client 130 that are not necessarily directly based on the screenshot. For example, the feature vector may include features based on metadata associated with the client 130, configuration information associated with the client 130, or sensor data retrieved from the client 130. The client management server 110 compares 504 the client feature vector with reference feature vectors to generate one or more classification scores. For example, in one embodiment, the reference feature vectors may include feature vectors associated only with the normal operating state and the classification score may represent a similarity measure between the client feature vector and the reference feature vectors. Alternatively, the reference feature vectors may include a first set of reference feature vectors associated with the normal operating state and a second set of reference feature vectors associated with the error state. Here, the client management server 110 may generate a first classification score representing a similarity between the client feature vector and the first set of reference feature vectors associated with the normal operating state, and a second classification score representing a similarity between the client feature vector and the second set of reference feature vectors associated with the error state. The client management server 110 classifies 506 the operating state of the client 130 based on one or more classification scores. For example, if only a single classification score is determined, the client management server 110 may classify the operating state as corresponding to the normal operating state if the classification score exceeds a predefined threshold, and otherwise classify the operating state as corresponding to the error state. Alternatively, if multiple classification scores are used, the client management server 110 may classify the operating state based on which classification score indicates a better match of the client feature vector with the respective reference feature vector sets for the normal operating state and the error state respectively.

In an alternative embodiment, some or all of the functions attributed to the client management server 110 may instead be performed on the client 130. For example, instead of receiving a screenshot from the client 130 at the server 110 and classifying the operating state at the server 110, the client 130 may instead store the classification model 306 and apply the classifier at the client 130 in order to self-diagnose an error state.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

The invention claimed is:

1. A method comprising:
   receiving, from a client device, a first screenshot representing first content displayed on the client device;
   applying a classifier based on a classification model to classify an operating state of the client device based on the first screenshot as corresponding to a normal operating state or an error state;
   responsive to the classifier classifying the operating state as corresponding to the error state, causing the client device to perform a remedial action;
   following the client device performing the remedial action, receiving a second screenshot representing second content displayed on the client device;
   applying the classifier to classify the operating state of the client based on the second screenshot; and
   responsive to the classifier classifying the second screenshot as corresponding to the error state, setting an escalation flag associated with the client device.

2. The method of claim 1, further comprising:
   receiving an indication that the client device is working properly;
   resetting the escalation flag;
   adding the second screenshot to a training set of screenshots indicative of the normal operating state; and
   re-training the classification model based on the training set.

3. The method of claim 1, wherein causing the client device to perform the remedial action comprises:
   causing the client device to perform a restart.

4. The method of claim 1, wherein applying the classifier based on the classification model comprises:
   identifying a configuration of the client device at a time corresponding to capturing the first screenshot; and
   selecting the classification model from a predefined set of classification models each corresponding to a different possible configuration.

5. A method comprising:
   receiving, from a client device, a first screenshot representing first content displayed on the client device;
   deriving a set of visual features from the first screenshot to generate a client feature vector;
   performing a first feature vector comparison of the client feature vector with a first plurality of reference feature vectors, the first plurality of reference feature vectors derived from a plurality of reference screenshots captured during a normal operating state;
   generating a first classification score based on a similarity between the client feature vector and the first plurality of reference feature vectors;
   applying a classifier based on a classification model to classify the operating state based on the first classification score as corresponding to the normal operating state or an error state; and
   responsive to the classifier classifying the operating state as corresponding to the error, state, causing the client device to perform a remedial action.

6. The method of claim 5, further comprising:
   performing a second feature vector comparison of the client feature vector with a second plurality of reference feature vectors, the second plurality of reference feature vectors derived from a second plurality of reference screenshots captured during the error state;

generating a second classification score based on a similarity between the client feature vector and the second plurality of reference feature vectors; and wherein applying the classifier based on the classification model to classify the operating state is further based on the second classification score.

7. The method of claim 6, further comprising:

prior to performing the second feature vector comparison, simulating errors on a plurality of training client devices by causing the plurality of training devices to operate in the error state;

receiving the second plurality of reference screenshots from the training client devices; and deriving the second plurality of reference feature vectors from the second plurality of reference screenshots.

8. The method of claim 5, further comprising:

following the client device performing the remedial action, receiving a second screenshot representing second content displayed on the client device;

applying the classifier to classify the operating state of the client based on the second screenshot; and responsive to the classifier classifying the second screenshot as corresponding to the error state, setting an escalation flag associated with the client device.

9. The method of claim 5, wherein causing the client device to perform the remedial action comprises:

causing the client device to perform a restart.

10. The method of claim 5, wherein applying the classifier based on the classification model comprises:

identifying a configuration of the client device at a time corresponding to capturing the first screenshot; and selecting the classification model from a predefined set of classification models each corresponding to a different possible configuration.

11. A non-transitory computer-readable storage medium storing instructions executable by a processor, the instructions when executed by the processor causing the processor to perform steps including:

receiving, from a client device, a first screenshot representing first content displayed on the client device;

applying a classifier based on a classification model to classify an operating state of the client device based on the first screenshot as corresponding to a normal operating state or an error state;

responsive to the classifier classifying the operating state as corresponding to the error state, causing the client device to perform a remedial action;

following the client device performing the remedial action, receiving a second screenshot representing second content displayed on the client device;

applying the classifier to classify the operating state of the client based on the second screenshot; and responsive to the classifier classifying the second screenshot as corresponding to the error state, setting an escalation flag associated with the client device.

12. The non-transitory computer-readable storage medium of claim 11, the instructions further causing the processor to perform steps including:

receiving an indication that the client device is working properly;

resetting the escalation flag;

adding the second screenshot to a training set of screenshots indicative of the normal operating state; and re-training the classification model based on the training set.

13. The non-transitory computer-readable storage medium of claim 11, wherein causing the client device to perform the remedial action comprises:

causing the client device to perform a restart.

14. The non-transitory computer-readable storage medium of claim 11, wherein applying the classifier based on the classification model comprises:

identifying a configuration of the client device at a time corresponding to capturing the first screenshot; and selecting the classification model from a predefined set of classification models each corresponding to a different possible configuration.

15. A non-transitory computer-readable storage medium storing instructions executable by a processor, the instructions when executed by the processor causing the processor to perform steps including:

receiving, from a client device, a first screenshot representing first content displayed on the client device;

deriving a set of visual features from the first screenshot to generate a client feature vector;

performing a first feature vector comparison of the client feature vector with a first plurality of reference feature vectors, the first plurality of reference feature vectors derived from a plurality of reference screenshots captured during a normal operating state;

generating a first classification score based on a similarity between the client feature vector and the first plurality of reference feature vectors;

applying a classifier based on a classification model to classify the operating state based on the first classification score as corresponding to the normal operating state or an error state; and responsive to the classifier classifying the operating state as corresponding to the error state, causing the client device to perform a remedial action.

16. The non-transitory computer-readable storage medium of claim 15, further comprising:

performing a second feature vector comparison of the client feature vector with a second plurality of reference feature vectors, the second plurality of reference feature vectors derived from a second plurality of reference screenshots captured during the error state;

generating a second classification score based on a similarity between the client feature vector and the second plurality of reference feature vectors; and wherein applying the classifier based on the classification model to classify the operating state is further based on the second classification score.

17. The non-transitory computer-readable storage medium of claim 16, the instructions further causing the processor to perform steps including:

prior to performing the second feature vector comparison, simulating errors on a plurality of training client devices by causing the plurality of training devices to operate in the error state;

receiving the second plurality of reference screenshots from the training client devices; and deriving the second plurality of reference feature vectors from the second plurality of reference screenshots.

18. The non-transitory computer-readable storage medium of claim 15, further comprising:

following the client device performing the remedial action, receiving a second screenshot representing second content displayed on the client device;

applying the classifier to classify the operating state of the client based on the second screenshot; and responsive to the classifier classifying the second screenshot as corresponding to the error state, setting an escalation flag associated with the client device.

19. The non-transitory computer-readable storage medium of claim 15, wherein causing the client device to perform the remedial action comprises:
causing the client device to perform a restart.

20. The non-transitory computer-readable storage medium of claim 15, wherein applying the classifier based on the classification model comprises:
identifying a configuration of the client device at a time corresponding to capturing the first screenshot; and
selecting the classification model from a predefined set of classification models each corresponding to a different possible configuration.

\* \* \* \* \*